US011822478B2

(12) United States Patent
Ge

(10) Patent No.: US 11,822,478 B2
(45) Date of Patent: Nov. 21, 2023

(54) CACHE ALLOCATION TECHNIQUES

(71) Applicant: Micron Technology, Inc., Boise, ID (US)

(72) Inventor: Liang Ge, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 237 days.

(21) Appl. No.: 17/420,350

(22) PCT Filed: Apr. 16, 2021

(86) PCT No.: PCT/CN2021/087833
§ 371 (c)(1),
(2) Date: Jul. 1, 2021

(87) PCT Pub. No.: WO2022/217592
PCT Pub. Date: Oct. 20, 2022

(65) Prior Publication Data
US 2023/0185723 A1    Jun. 15, 2023

(51) Int. Cl.
*G06F 12/08* (2016.01)
*G06F 12/0871* (2016.01)
*G06F 12/0897* (2016.01)

(52) U.S. Cl.
CPC ...... *G06F 12/0871* (2013.01); *G06F 12/0897* (2013.01)

(58) Field of Classification Search
CPC .................. G06F 12/0871; G06F 12/0897
See application file for complete search history.

(56) References Cited

U.S. PATENT DOCUMENTS

2020/0019513 A1 * 1/2020 Kozhikkottu ....... G06F 12/1054

OTHER PUBLICATIONS

Edge, Jake, "Stream IDs and I/O hints", May 4, 2016, "LWN.net" website, https://lwn.net/Articles/685499/, last retrieved on Jun. 30, 2021.

* cited by examiner

*Primary Examiner* — Jae U Yu
(74) *Attorney, Agent, or Firm* — Holland & Hart LLP

(57) ABSTRACT

Methods, systems, and devices for cache allocation techniques are described. The memory system may receive a write command that includes a stream identification (ID) associated with performance constraints for data streams. The memory system may determine an application identification (ID) that indicates a type of data based on the stream ID of the write command. In some cases, the memory system may assign a level associated with the application ID that indicates an amount of data to be written for the write operation and allocate an amount of space available to be written for the write operation in a single-level cell cache based on the assigned level. The memory system may write the data to the single-level cell cache within the amount of space of the single-level cell cache.

20 Claims, 7 Drawing Sheets

| Write Command 300 | | | | | | | | |
|---|---|---|---|---|---|---|---|---|
| Bit<br>Byte | 7 | 6 | 5 | 4 | 3 | 2 | 1 | 0 |
| 0 | Operation Code 305 ||||||||
| 1 | WRPROTECT = 000b ||| DPO | FUA | Res. | FUA_NV | Obsc. |
| 2 | Logical Block Addresses 310 ||||||||
| 3 | ||||||||
| 4 | ||||||||
| 5 | ||||||||
| 6 | Reserved ||| Group Number 315 |||||
| 7 | Transfer Length 320 ||||||||
| 8 | ||||||||
| 9 | CONTROL = 00h ||||||||

FIG. 3

CACHE ALLOCATION TECHNIQUES

CROSS REFERENCE

The present Application for Patent is a 371 national phase filing of International Patent Application No. PCT/CN2021/087833 by G E et al., entitled "CACHE ALLOCATION TECHNIQUES," filed Apr. 16, 2021, assigned to the assignee hereof, and expressly incorporated by reference herein.

FIELD OF TECHNOLOGY

The following relates generally to one or more systems for memory and more specifically to cache allocation techniques.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 3 illustrates an example of a write command that supports cache allocation techniques in accordance with examples as disclosed herein.

DETAILED DESCRIPTION

Figure 1:
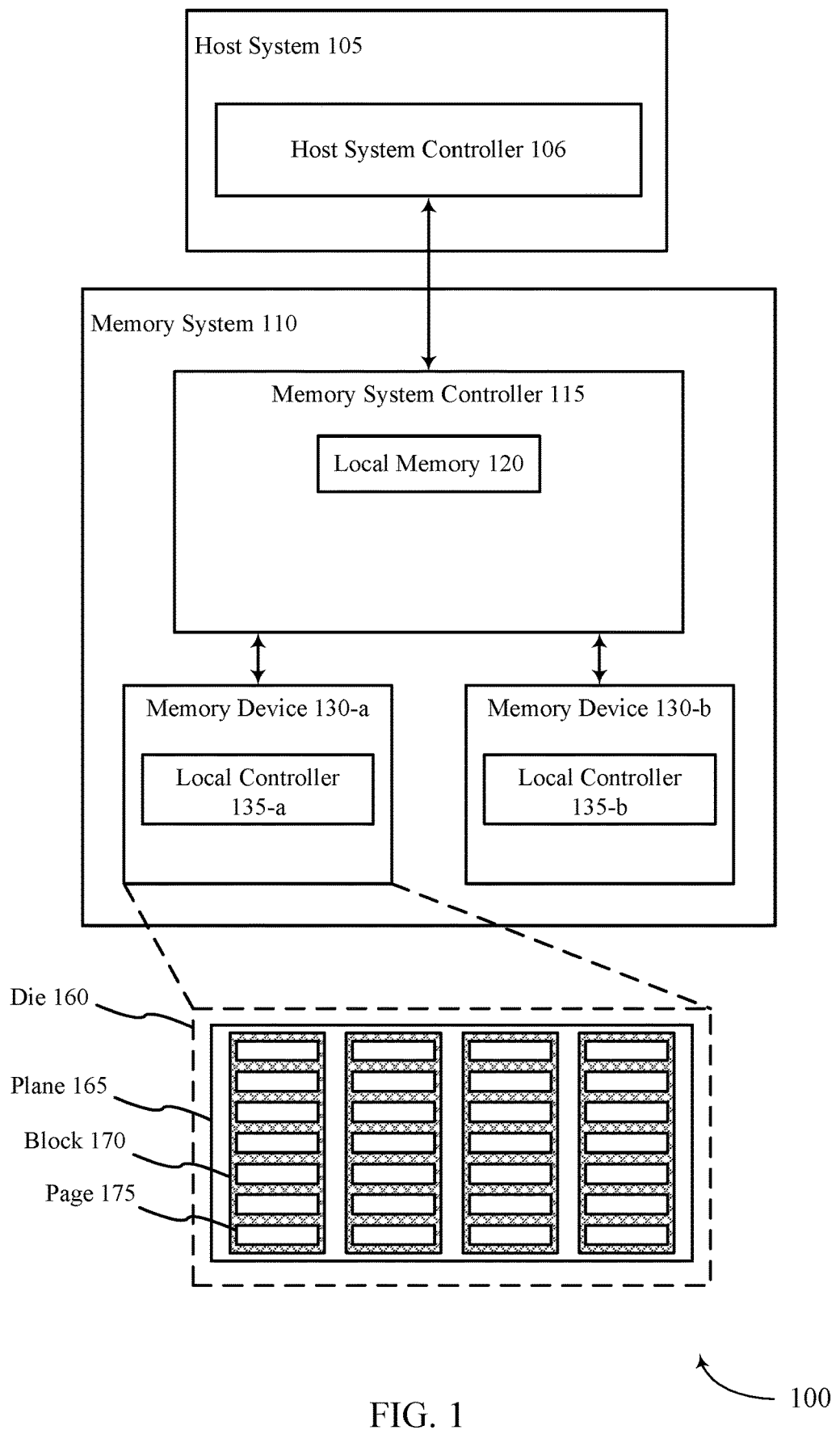
FIG. 1 illustrates an example of a system that supports cache allocation techniques in accordance with examples as disclosed herein.

A memory system may include an available cache to write incoming data. In some cases, the amount of incoming data to be written to the memory system may exceed or may nearly exceed an amount of available space in the cache (e.g., a single level cell (SLC) cache) available to be written. In such cases, however, the cache, which may be lower-level cell cache (e.g., SLC cache), may run out or nearly run out of available space to be written. The memory system may, instead of writing to the lower-level cell cache, write to a higher-level cell cache of the memory system, which may comparatively increase the latency for start-up time and performing operations compared to writing to the lower-level cell cache. Thus, the memory system may experience a performance drop during the timeslots if the lower-level cell cache, which may be an SLC cache, cache is full or nearly full, and the memory system writes to a different, higher-level cell cache, which may be a multi-level cell (MLC) cache, a tri-level cell (TLC) cache, or quad-level cell (QLC) cache, etc. Writing the data to the SLC cache without allocating an amount of space available may fill the total space available (or nearly fill the total space available) in the cache at a faster rate than desired due to the limited space, thereby decreasing the user experience and reducing the life of the memory system, among other disadvantages. The memory system may additionally or alternative use additional time to recover the SLC cache (e.g., storing a portion of the SLC cache local to the memory device) thereby decreasing the efficiency and the start-up time of performing various operations and decreasing the overall performance of the memory system.

System, devices, and techniques are described to improve the overall efficiency and operations of the memory system that may otherwise experience a performance drop from writing to a higher-level cell cache instead of a lower-level cell cache. In some memory systems, the user experience, among other factors, may be improved by allocating an amount of space available to be written in a lower-level cell cache, such as an SLC cache, based on or in response to an amount of data to be written for the write operation (e.g., information related to a received write command). The memory system may receive a write command that includes a stream identification (ID) for one or more data streams (e.g., multiple steams of data associated with each other) associated with the write operation. The stream ID may identify one or more different data streams which may be associated with (e.g., use or relate to operational aspects for) different performance constraints to increase the user experience. The memory system may determine an application identification (ID) that may indicate a type of data of the write operation based on or in response to the stream ID. In some cases, the memory system may assign a level associated with the application ID and the level may indicate or be related to an amount of data to be written for or in response to the write operation. In such cases, the memory system may allocate an amount of space available to be written for the write operation in the lower-level cell cache (e.g., instead of allowing the result of the write operation allocate a total amount of space available to be written in the lower-level cell cache) based on or in response to the level assigned. For example, the memory system may set different upper limitations of the amount of space available to be written for different data streams of different types and according to each application performance constraint (e.g., performance requirement). The memory system may then write the data to the SLC cache within the amount of space allocated, which may be within the set upper limit of the amount of space available to be written.

In such cases, the memory system may ensure that each application associated with the application ID may reach a performance threshold by limiting the lower-level cell cache space used (e.g., amount of space available to be written in the lower-level cell cache such as an SLC cache). Thus, by setting an upper limit of the amount of space available to be written in the lower-level cell cache, the memory system or other components may be able to perform operations at improved speeds and efficiency, thereby ensuring the that the memory system and application performance provides a stable user experience. Improving the lower-level cell cache usage by setting (e.g., assigning) an upper limit of an amount of space within the lower-level cell cache based on or in response to the type of data associated with the application ID may decrease a latency for start-up time and performing operations as well as increase a reliability of performing the application associated with the application ID, among other benefits.

Figure 2:
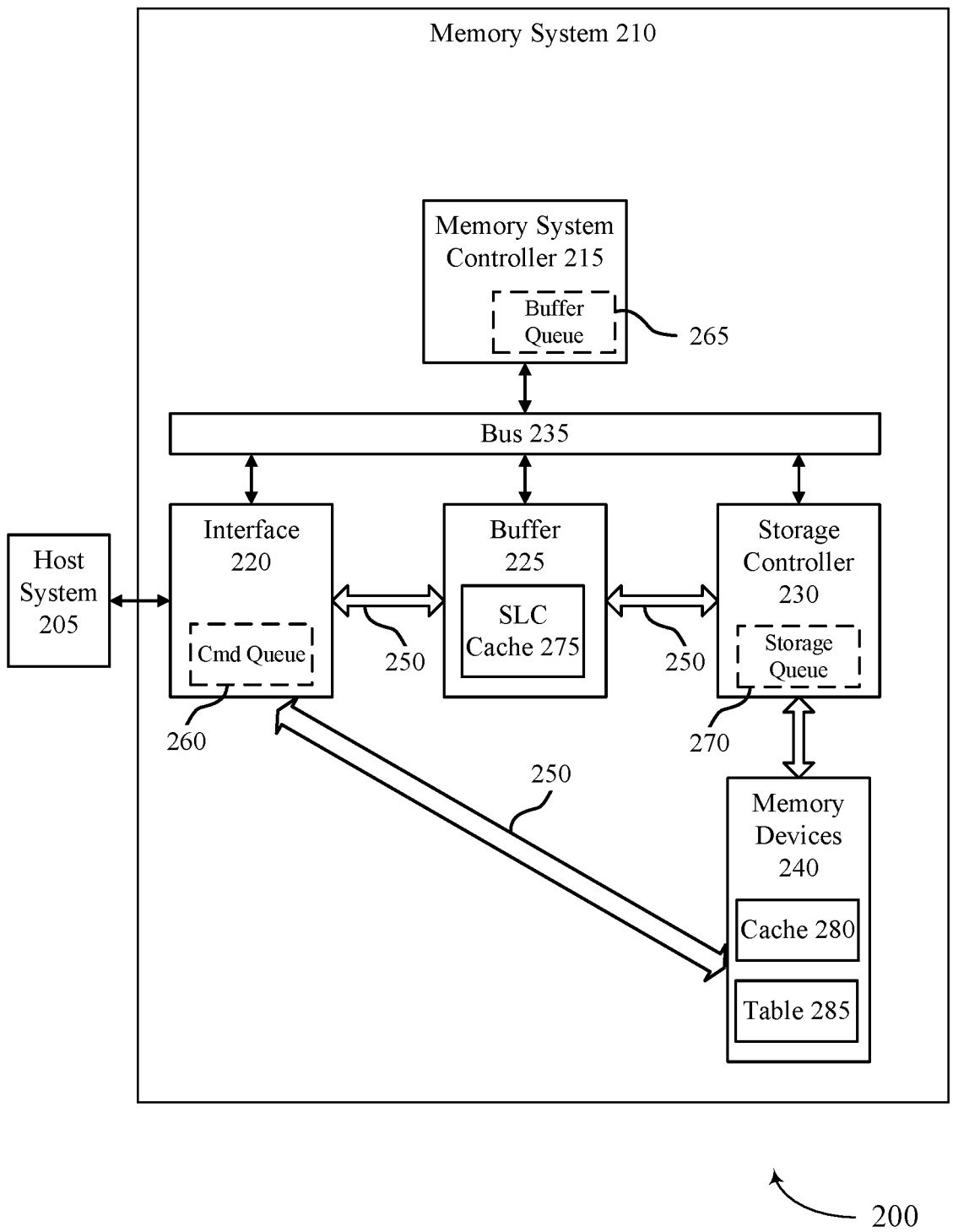
FIG. 2 illustrates an example of a system that supports cache allocation techniques in accordance with examples as disclosed herein.

Features of the disclosure are initially described in the context of systems with reference to FIGS. 1 through 2. Features of the disclosure are described in the context of apparatus and flow diagrams with reference to FIGS. 3-6. These and other features of the disclosure are further illustrated by and described in the context of an apparatus diagram and flowchart that relate to cache allocation techniques with reference to FIGS. 7-8.

FIG. 1 illustrates an example of a system 100 that supports cache allocation techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or any combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support cache allocation techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In other different systems distinct from the present disclosure, a memory system may receive a write command and allocate a same amount of space in a cache, such as an SLC cache) regardless of data associated with the write command. For example, a first write command may be allocated a portion of space within the cache and a second write command may be allocated the same portion of space within the cache. In such cases, the space allocation may be static or fixed and may be overprovisioned to require more space in the cache than is needed for operation and/or a given user experience. In some examples, an entire portion of the cache may be unnecessarily written for the write operation based on or in response to the received write command. In such cases, the other different memory system may experience decreased processing times, increased start-up times, and decreased user experience (e.g., overall performance), among other disadvantages.

To address decreased memory performance, the memory system 110 in line with the present disclosure may adjust (e.g., dynamically adjust) a space allocated within a cache, such as a lower-level cell cache (e.g., an SLC cache) based on or in response to one or more of the incoming write commands. For example, the memory system 110 may receive a write command and identify, as part of the write command, that the write command includes a stream ID that is associated with a given application ID. The stream ID may be associated with one or more performance constraints for one or more data streams associated with the write operation indicated by the write command and the application ID may indicate a type of data of the write operation based on the stream ID. In some cases, the memory system 110 may assign a level to the application ID and allocate an amount of space of the cache based on or in response to the assigned level. In such cases, the memory system 110 may write the data to the allocated space in the cache. By setting a limit for allocated space to be written, the memory system 110 may experience improved processing times and improved user experience, among other benefits.

FIG. 2 illustrates an example of a system 200 that supports cache allocation techniques in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using one or more access commands (e.g., read commands or write commands). The system 200 may implement or may be implemented by aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on or in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, the buffer 225 may include an SLC cache 275, which may be an example of a lower-level cell cache. In other examples, additionally or alternatively, the memory device 240 or other components of the memory system 210 may include an SLC cache 275. The SLC cache 275 may temporarily store data. For example, the SLC cache 275 may include available space to store the data associated with a received write command. The SLC cache 275 may be allocated (e.g., divided) into different portions (e.g., amounts) of space available to be written into the SLC cache 275 based on or in response to a level assigned to an application ID. In some cases, an upper limit of the amount of space available to be written in the SLC cache 275 may be set by one or more components in the memory system 210 (e.g., the memory system controller 215) based on or in response to the level assigned. The application ID may indicate a type of data of the write operation (e.g., referenced in the write operation) based on a stream ID of the write command, among other factor. Data may be written to the SLC cache 275 within the upper limit of the amount of space available based on or in response to allocating (e.g., setting the upper limit of) the amount of space available to be written. The amount of space available to be written in the SLC cache 275 may, in some examples, be allocated differently based on or in response to one or more different assigned levels, one or more different types of data to be written, other factors, or any combination thereof. In some cases, allocating the amount of space available to be written may be less than a total amount of space available to be written in the SLC cache 275.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

In some cases, the memory device 240 may include a cache 280, which may be an example of a higher-level cell cache, and may store information 285, which may be an example of a table such as a look-up table. The cache 280 may be located, for example, in the buffer 225 or other components of the memory system 210. The cache 280 may be an example of a TLC cache, a MLC cache, a QLC cache, or a cache with a higher order level of cells than another cache in memory system 210, such as the SLC cache 275. The cache 280 may temporarily store data and include available space to store the data for some duration. For example, data may be written to the cache 280 based on or in response to determining that the amount of space available to be written in the SLC cache 275 satisfies a threshold (e.g., the amount of space available to be written in the SLC cache 275 is lower than a given threshold). In such cases, the amount of space available to be written in the SLC cache 275 may less than the amount of data to be written, and the data may be written by the memory system 210 to a different cache (e.g., cache 280).

The information 285 may be an example of a look-up table that may include a value that indicates the application ID associated with the stream ID. For example, one or more components of the memory system 210 may perform a look-up procedure for the information 285 to determine, in some examples, the application ID associated with the stream ID of the write command. In such cases, the memory system 210 may receive the write command and perform the look-up procedure in the information 285. The information 285 may be an example of an application ID and stream ID mapping table that maps one or more respective stream IDs to one or more respective application IDs. For example, the storage controller 230 may reference the information 285 (e.g., perform the look-up procedure) and may allocate (or may be configured to indicate to another component of memory system 210 to allocate) the space available to be written in the SLC cache 275 based on or in response to the mapping between the application ID and the stream ID. In some cases, the information 285 may be stored in the buffer 225 or one or more other components of the memory system 210. The interface 220 may translate data between the host system 205 and the cache 280 of the memory device 240 by the data path 250. For example, the memory system controller 215 may cause the memory device 240 to transfer data to the host system 205 using the data path 250.

To process a read command received from the host system 205, the memory system controller 215 may determine if the buffer 225 has sufficient available space to store the data associated with the command. For example, the memory system controller 215 may determine, for example via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

FIG. 3 illustrates an example of a write command 300 that supports cache allocation techniques in accordance with examples as disclosed herein. The write command 300 may be an example of the write command described with reference to FIGS. 1 and 2. The write command 300 may include an operation code 305, a logical block addresses 310, a group number 315, and a transfer length 320, among other aspects.

The write command 300 may be an example of a command transmitted, by the host system, to a memory system and the command may include instructions to perform a write operation. For example, the memory system may receive the write command 300. In some cases, an indication to perform a write operation may be sent in other types of commands other than the write command 300. The write command 300 may include various bits, such as bits 0 through 7 and bytes 0 through 9. Each numbered box in the write command may represent a byte of information that includes a plurality of bits or a bit of information. The write command 300 may include the operation code 305 which may be associated with an operating condition of the memory system to be implemented based on the write command 300. In some cases, the memory system may generate the operation code 305 to indicate the operating condition based on the write command 300 including the operation code 305 earlier.

In some examples, the write command 300 may include logical block addresses 310. The logical block addresses 310 may be associated with one or more physical addresses of the memory system to access during execution of the write operation. The write command 300 may include the transfer length 320. The transfer length 320 may indicate a length of the quantity of bytes that may or may not be transferred from the memory system, to the memory system, or both.

The write command 300 may include the group number 315. The group number 315 may be an example of, may include, or may otherwise indicate a stream ID as described in reference to FIGS. 1 and 2. In such cases, the memory system may use information included in the group number 315 (e.g., the stream ID) to set an upper limit of the amount of space in the cache of the memory system. The group number 315 (e.g., the stream ID) may be associated with one or more performance constraints for one or more data streams associated with the write operation. The group number 315 (e.g., the stream ID) may be used by the memory system to set an upper limit of a SLC cache size for one or more applications based on or in response to a usage of one or more of the applications (if not each application), thereby avoiding an application burst (e.g., receiving an increased amount of requests to run more than one application) that may otherwise and unnecessarily consume an increased amount of space within the SLC cache, which may result in other applications having a slower response in this burst timeslot. The burst timeslot may be an example of a period of time that the memory system receives a burst of commands (e.g., more than one) to be handled.

The group number 315 may be used, for example, by the memory system to identify what type of data may be included in the data streams associated with the write operation. In such cases, the group number 315 may indicate whether bits of information may be part of a same data stream or part of a related data stream (e.g., compared to a same data stream or others for example). The group number 315 may indicate that a string of information may be related to each other and part of a single data stream. The group number 315 may be used by the memory system to convey the type of information that the memory system may expect to receive from the host system such that the memory system may determine what to do with the incoming data stream (e.g., whether to perform a read operation, write operation, erase operation, store the incoming data stream, among other examples).

A group of individual data writes may be an example of a collective data stream which may be an example of multiple streams of data associated with each other. Each data stream may be given a unique ID (e.g., stream ID). For example, the host system may transmit a stream ID (e.g., which may be an example of an I/O hint that includes information to assist the memory system in determining how to store data) that may be configured to indicate to or instruct one or more storage components of the memory system how or where to store the incoming data and what types of data may be included in the incoming data. In some cases, the stream ID may identify multiple data streams that may be associated with each other. In some cases, the stream ID may indicate, to the memory system, data writes associated with one another or that have a similar lifetime. The stream ID may allow for faster communication between the host system and the memory system, thereby increasing efficiency of the memory system and improving performance and consistent performance and latency. In some cases, the memory system may be able to use the stream ID to reference stored information (e.g., in a look-up table) to determine how to interpret the information included in the data stream. Based on determining the stream ID, the memory system may reference the look-up table and determine what to do next.

The memory system may set different upper limitations of the amount of space available to be written in a cache for different data streams and according to one or more related application performance constraints (e.g., performance requirements) for each of the different data streams. For example, the stream ID may indicate the performance constraints where the performance constraints may be an example a start-up time to load an application, a duration of time to run the application, a quantity of real-time data, or any combination thereof. In some cases, the memory system may determine whether the one or more performance constraints satisfies a threshold based on the stream ID. For example, if the quantity of real-time data associated with a given application exceeds a threshold, the memory system may assign a first level based on or in response to determining that the one or more performance constraints exceeds the threshold. For example, if the quantity of real-time data associated with a given application does not exceed a threshold, the memory system may assign a second level based on or in response to determining that the one or more performance constraints does not exceed the threshold.

In some cases, the memory system may assign the stream ID to a same erase block. In such cases, the stream ID, which may relate multiple write operations to each other, may be assigned to the same erase block in the memory system. The stream ID may be associated with performance constraints for data streams (e.g., including a group of individual writes). In some cases, the host system may erase the data stream including the group of individual writes that may be written to the memory system at a same time or as part of a same erase operation, thereby decreasing a total quantity of erase operations performed on the memory system.

Figure 4:
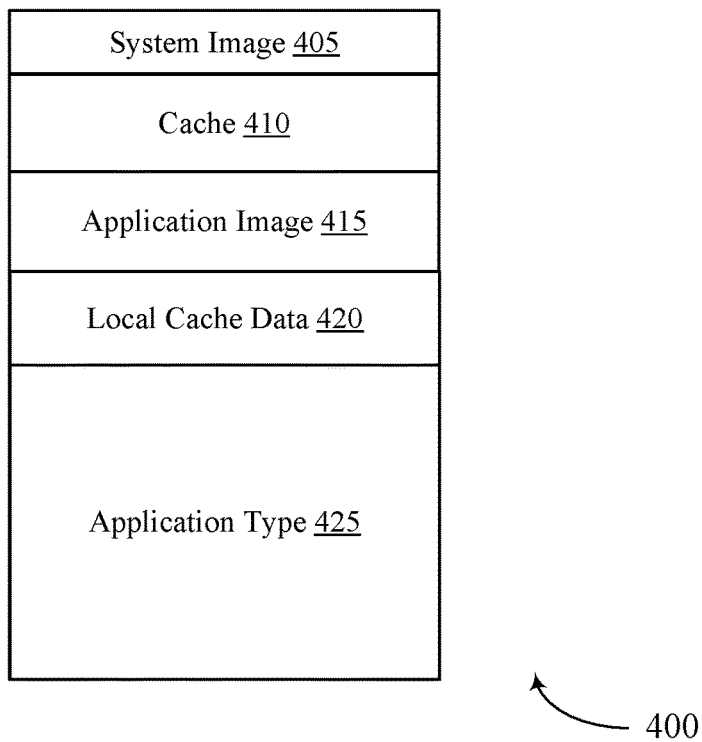
FIG. 4 illustrates an example of a data attributes layout that supports cache allocation techniques in accordance with examples as disclosed herein.

FIG. 4 illustrates an example of a data attribute layout 400 that supports cache allocation techniques in accordance with examples as disclosed herein. The data attribute layout 400 may include types of data related to indicators such as a system image 405, a cache 410, an application image 415, a local cache data 420, and an application type 425.

Based on the stream ID, the memory system (e.g., a memory system controller) may determine an application ID that indicates a type of data of the write operation. The type of data may be an example of a picture (e.g., system image 405), a video (e.g., a user recorded video), a movie, a read or write only cache (e.g. cache 410 or local cache data 420), an application image (e.g., application image 415), configuration files, or any combination thereof. In some cases, the memory system may determine an attribute of the application ID in response to determining the application ID. The attribute may be, for example, a size of the data associated with the write operation, the type of data associated with the write operation, a frequency associated with accessing the data, or any combination thereof.

The attributes may be related to respective types of application ID. The data attribute layout 400 may be configured to indicate to the memory system the type of data (e.g., whether the data is hot or cold based on a relative level of access or request from a host system, read-only or write-only, sequential or non-sequential, etc.). For example, the data attribute layout 400 may include a system image 405. The system image 405 may include the attributes of the frequency associated with accessing (e.g., fast data) and the type of data (e.g., sequential and read-only data). The data attribute layout 400 may include a cache 410. The cache 410 may include the attributes of the frequency associated with accessing (e.g., fast data) and the type of data (e.g., hot data). The data attribute layout 400 may include the application image 415, which may include the attribute of the type of data (e.g., sequential and read-only data). In some examples, the data attribute layout 400 may include local cache data 420 which may include the attribute of the type of data (e.g., hot and read-only data). The data attribute layout 400 may include the application type (e.g., picture, video, movie) which may include the attribute of the type of data (e.g., cold data).

The memory system may determine an application ID based on the stream ID of the write command. For example, the application ID may be determined from the stream ID by performing a determination or a reference procedure, such as look-up procedure in a table. In such cases, the memory system may look-up the stream ID in the table, and the table may indicate the application ID associated with the stream ID or may provide an indication to be used in determining the application ID. The table may be an example of a reference list that indicates how respective application IDs correspond to respective stream IDs. For example, a stream ID may include a code (e.g., a value) that a processor of the memory system may use to reference a preconfigured list and may then reference the application ID based on the value in the list. In other examples, the stream ID may be the application ID. In some examples, the application ID may be determined based on a type of data associated with the stream ID (e.g., a group of individual data writes).

In some cases, the stream ID and the application ID may be used to limit the application space in the cache. For example, the memory system may determine the application ID based on the stream ID, and the memory system may assign a level associated with the application ID that may indicate an amount of data to be written based on an underlying write command. The memory system may then allocate an amount of space available to be written (e.g., may limit the amount of space available to be written for an application) in the cache based on or in response to the assigned level associated with the application ID. By limiting the amount of space available to be written for an application, the memory system may be able to perform operations at improved speeds and efficiency, thereby ensuring the that the memory system and application performance provides a stable user experience. Improving the lower-level cell cache usage by allocating an amount of space available to be written based on the assigned level associated with the application ID may decrease a latency for start-up time and performing operations as well as increase a reliability of performing the application associated with the application ID, among other benefits.

Figure 5:
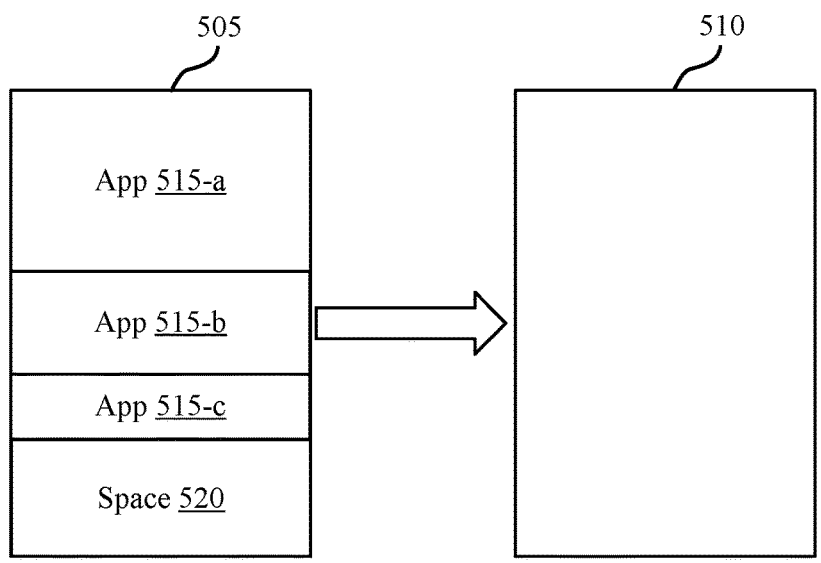
FIG. 5 illustrates an example of a block diagram that supports cache allocation techniques in accordance with examples as disclosed herein.

FIG. 5 illustrates an example of a block diagram 500 that supports cache allocation techniques in accordance with examples as disclosed herein. The block diagram 500 may include a lower-level cell cache, for example an SLC cache 505, and a higher level cell cache, for example a different cache 510 which may be an MLC cache, a TLC cache, or a QLC cache. The memory system may divide the available space in the SLC cache 505 so that the SLC cache space may correspond to space for different applications (e.g., application 515-a, 515-b, or 515-c). The SLC cache 505 may also include available space 520 at a given time.

The memory system may assign a level associated with the application ID (e.g., associated with application 515-a, 515-b, or 515-c) that may indicate or be indicative of an amount of data to be written to the SLC cache 505 for the write operation. In some examples, based on a usage model (e.g., whether the type of data includes real-time data and/or an amount of real-time data), a descriptive model (e.g., a duration of time to load the application 515, a duration of time to run the application 515, an access frequency), among other options such as a predictive model or a configured distribution (or combination of two or more models), the host system may set different levels for the SLC cache 505 and transmit, to the memory system, the different levels. For example, based on a potential usage type for the different applications 515, the memory system may assign a level to one or more applications 515 and allocate an amount of space in SLC cache 505 for the one or more applications. Table 1 may illustrate the different levels that may be assigned based on or in response to the usage model.

TABLE 1

| Application | Usage model | Level |
| --- | --- | --- |
| Application 515-a | Large real-time data | 1 |
| Application 515-b | Small real-time data | 2 |
| Application 515-c | No real-time data | 3 |

In some cases, application 515-a may be assigned a first level, application 515-b may be assigned a second level, and application 515-c may be assigned a third level. The level assigned to each application 515 may be based on or in response to the usage model (e.g., whether the type of data includes real-time data such as a level of real-time data, a duration of time to load the application 515, a duration of time to run the application 515, an access frequency associated with the application 515, among others). In some cases, the memory system may assign a level associated with the application ID based on "N" usage models (e.g., multiple usage models, different usage models, among others). Each application 515 may include performance constraints (e.g., performance requirements) associated with the stream ID. The performance constraints may be an example a start-up time to load an application, a duration of time to run the application, a quantity of real-time data, or any combination thereof. In such cases, the performance constraints may include real-time data. In such cases, the memory system may determine whether the type of data includes a given threshold amount of or level of the real-time data based on or in response to determining the application ID. The memory system may assign the level in direct response to determining that type of data includes the given threshold amount of or level of real-time data.

The first level may be associated with a large real-time data usage model. For example, the application 515-a may process an increased amount of real-time data, write an increased amount of real-time data, or receive real-time responses as part of the application 515-a's operation, or any combination thereof. In such cases, application 515-a may be assigned to the first level. The second level may be associated with a small real-time data usage model. For example, the application 515-b may process less real-time data than application 515-a, write less real-time data than application 515-a, or receive less real-time responses than application 515-a as part of the application 515-a's operation. In such cases, application 515-b may be assigned to the second level. The third level may be associated with no real-time data usage model. For example, the application 515-c may not process or write real-time data (e.g., may instead write data in non-real-time) or may receive no real-time responses. In such cases, application 515-c may be assigned the third level.

In some cases, the memory system may identify a first threshold between the first level and the second level. In such cases, the memory system may determine which level the application 515 may be assigned to based on or in response to determining whether the application 515 satisfies the first threshold. The memory system may identify a second threshold between the second level and the third level. In such cases, the memory system may determine which level the application 515 may be assigned to based on or in response to determining whether the application 515 satisfies the second threshold. In some examples, one or both of the first threshold or second threshold may be or include an amount of real-time data, a level or categorization of the real-time data, a percentage of the usage that may be real-time data, whether the type of data includes real-time data or not, a duration of time to load the application 515, a duration of time to run the application 515, an access frequency associated with the application 515, or combination thereof, among other examples.

Real-time data may be an example of data that may be loaded while the application 515 is in use. For example, the memory system may download in real-time a video, movie, or music that may be streamed from a network associated with the memory system. In such cases, the memory system may assign a first level or a second level to the application 515 based on or in response to the usage of real-time data, or an expected usage of real-time data, or both. In other examples, the memory system may run an application 515 that may include predownloaded videos, movies, or music. In such cases, the memory system may assign a second level or a third level to the application based on or in response to the usage of real-time data or an expected usage of real-time data.

The memory system may calculate a quantity of downloaded data to assign a level to the application ID and ensure a stable user experience associated with executing the application 515. In some cases, for example, downloading the data within a short duration of time may not improve the user experience because the data is not executed (e.g., played) until a later time. In some examples, the memory system may determine an amount of data that may be used within a duration of time of the download and set (e.g. initially or update) the assigned level based on or in response to the determined amount of data. For example, the duration may be one second, and the memory system may assign a first level to the application ID based on or in response to an amount of data used within the duration. In other examples, the duration may be ten seconds, and the memory system may assign a second level to the application ID based on or in response to an amount of data used with the duration. In such cases, the memory system may determine which level may be assigned to the application ID to result in a stable user experience based on the amount of data used within the duration, thereby ensuring that each application 515 satisfies a performance threshold.

The memory system may allocate an amount of space available to be written for the write operation in the SLC cache 505 of the memory system based on or in response to the level assigned. In such cases, the memory system may divide the SLC cache 505 into different segments (e.g., subsets of space available to be written) and allocate each segment to a different application ID (e.g., application 515-a, 515-b, or 515-c). The SLC cache 505 may be divided based on or in response to a use percentage (e.g., how frequent the application 515 may be executed), a flush control (e.g., a threshold to perform a flush operation), or a cursor (e.g., amount of space available in the cursor). The amount of space available to be written may be allocated differently based on or in response to different assigned levels, different types of data, or both.

In some examples, the memory system may set, for example in the SLC cache 505, an upper limit of the amount of space available to be written based on or in response to the level assigned. For example, the memory system may set an upper limit size for at least some if not each application 515 based on or in response to an application performance requirement associated with at least some if not each application 515. In such cases, the application 515-a may be assigned the first level and may be allocated a first portion of the available SLC cache 505 space based on or in response to the usage model. The application 515-b may be assigned the second level and may be allocated a second portion (which may be smaller than the first portion) of the available SLC cache 505 space based on or in response to the usage model. For example, the first level may be allocated a portion of the available SLC cache 505 larger than the second level. The application 515-c may be assigned the third level and may be allocated a third portion of the available SLC cache 505 space based on or in response to the usage model. For example, the third level may be allocated a portion of the available SLC cache 505 smaller than at least one of if not each of the first level and second level.

The memory system may refrain from over allocating a portion of the SLC cache 505 to an application 515 and may do so based on or in response to, for example, a quantity of real-time data associated with the application 515. For example, the memory system may receive a write command associated with writing real-time data, and assign the first level to the application 515-a. The memory system may write the data to the SLC cache 505 within the amount of space allocated rather than writing the data to the entire available space of the SLC cache 505, which may reserve some available space of the SLC cache 505 for writing other data, among other benefits. The entire available space of the SLC cache 505 may be the entire space of the SLC cache 505 if data was not previously written to the SLC cache 505, or the entire available space may be a remaining portion of the SLC cache 505 (e.g., including space 520). Space 520 may be an example of an amount of space within the SLC cache 505 that may be unwritten based on space written for prior applications, such as applications 515-a, 515-b, and 515-c. In some examples, allocating the amount of space available to be written may be less than a total amount of space available to be written in the SLC cache 505 of the memory system.

In some case, the memory system may erase data from the SLC cache 505 based on or in response to writing the data to the SLC cache 505. For example, while allocating the SLC cache 505 or as part of performing the write operation, the memory system may perform one or more clean-up operations that include recovering more SLC space from TLC space, deleting data, or moving data from the SLC cache 505 to the cache 510 (e.g., TLC cache or QLC cache). In other examples, the memory system may perform the clean-up operations before or after allocating space within the SLC cache 505 for one or more applications 515 and performing the write operation.

The memory system may allocate the amount of space available to be written dynamically. For example, the memory system may determine an application ID, assign the level, and allocate the amount of space in response to receiving a first write command. The memory system may receive a second write command and begin determining the application ID, assigning the level, and allocating the amount of space available while (e.g., during durations that at least partially overlap, during same durations) as allocating the amount of space associated with the first received write command. In such cases, the memory system may dynamically adjust the amount of space available to be written in the SLC cache 505 based on or in response to the pending write commands. In other examples, the memory system may write the data to the SLC cache 505 within the amount of space while the memory system performs the clean-up operations.

In some cases, the memory system may receive multiple write commands associated with a same level assigned to the application ID. The amount of space available to be written may be less than the amount of data to be written. In such cases, the memory system may write the data to the SLC cache 505 and write the remaining data to the different cache 510. For example, the memory system may determine whether the amount of space available to be written in the SLC cache 505 satisfies (e.g., exceeds) a threshold based on or in response to assigning the level. The memory system may write a second set of data to the different cache 510 of the memory system based on or in response to determining that the amount of space available satisfies the threshold. The different cache 510 may an example of a TLC cache, QLC cache, MLC cache, or any order level cell that is higher than the level cell of the SLC cache 505. In some cases, the SLC cache 505 may be an example of any order lower level cell than the memory of the different cache 510. A faster cache may be an example of a MLC cache and the slower cache may be an example of a TLC cache or QLC cache. In some examples, the SLC cache 505 may be instead an MLC cache and the different cache 510 may be a TLC cache or a QLC cache. In some examples, the SLC cache 505 may be instead a TLC cache and the different cache 510 may be a QLC cache.

In other systems, writing data to the higher order level cell cache (e.g., different cache 510) may increase the latency for start-up time and performing operations compared to writing data to the SLC cache 505, thereby resulting in the user experiencing a lag time if executing the application 515. In some cases, the memory system may experience a slower throughput and the next write command received may also experience increased latency for start-up and performing operations, thereby, decreasing the efficiency and overall performance of the memory system. Thus, the memory system may experience a performance drop during the timeslots if the SLC cache is full and the memory system may write to a different cache.

To improve the overall efficiency and operations of the memory system, the memory system may identify, from the received write commands, multiple applications (e.g., application IDs) associated with different levels of performance and real-time data usage. The memory system may assign levels associated with the application IDs and set limits of an amount of space available to be written for each application within the SLC cache 505 based on or in response to the level assigned. For example, the memory system may use the stream ID of the write command and the application ID associated with the type of data of the write operation to dynamically adjust the allocated portion of the SLC cache 505 based on the application type.

Thus, setting an upper limit of the amount of space available to be written may allow the memory system or other components to perform operations at improved speeds, efficiency, thereby ensuring a stable user experience while executing the applications 515. Improving the SLC cache usage by assigning an amount of space within the SLC cache based on or in response to the type of data (e.g., level assigned) may decrease a latency for start-up time and performing operations and increase a reliability of performing the application 515 associated with the application ID, among other benefits.

Figure 6:
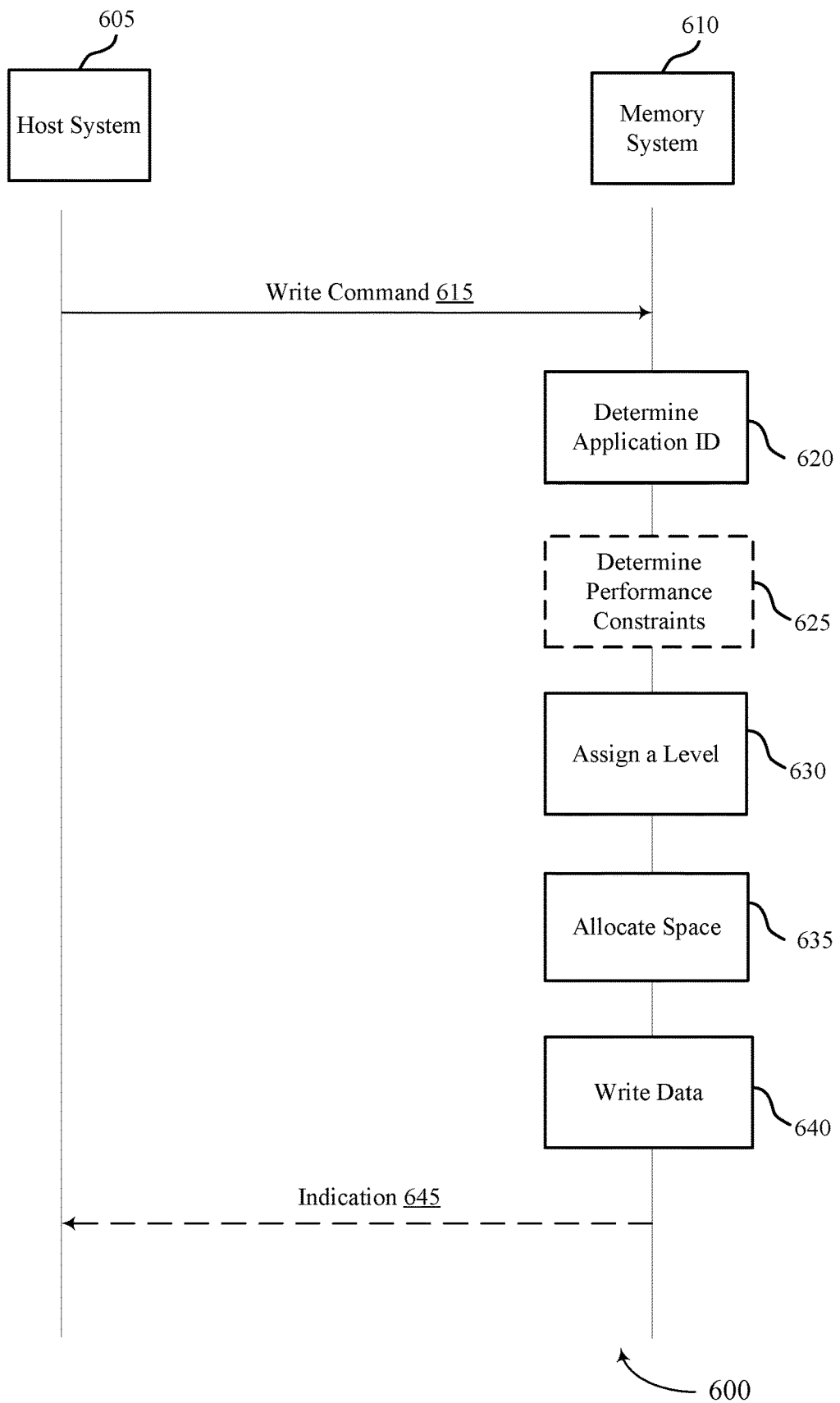
FIG. 6 illustrates an example of a flow diagram that supports cache allocation techniques in accordance with examples as disclosed herein.

FIG. 6 illustrates an example of a flow diagram 600 that supports cache allocation techniques in accordance with examples as disclosed herein. Flow diagram 600 may include host system 605 and memory system 610, which may be respective examples of a host system 105 and memory system 110 as described in reference to FIG. 1 through 5. Alternative examples of the following may be implemented, where some steps are performed in a different order or not at all. Some steps may additionally include additional features not mentioned below. The flow diagram 600 illustrates techniques where a memory system allocates space available to be written in a cache of the memory system.

Aspects of the flow diagram 600 may be implemented by a controller, among other components. Additionally or alternatively, aspects of the flow diagram 600 may be implemented as instructions stored in memory (e.g., firmware stored in a memory coupled with the memory system 610). For example, the instructions, if executed by a controller (e.g., the memory system controller 115 or the storage controller 230), may cause the controller to perform the operations of the flow diagram 600.

At 615, a write command may be transmitted. For example, the host system 605 may determine that data is to be written to the memory system 610 and that the data may be part of a data stream. In such cases, the host system 605 may transmit the write command to the memory system 610. In such cases, the memory system 610 may receive the write command to perform a write operation. The write command may include a stream ID associated with one or more performance constraints for one or more data streams associated with the write operation. The stream ID may indicate the performance constraints. In some examples, the stream ID may be associated with the performance constraints such that the memory system 610 may use the stream ID to look up the performance constraints in a table. The memory system 610 may identify, as part of write command, that the write command includes a stream ID that ties together chunks of data associated with different write operations.

At 620, an application ID may be determined. For example, the memory system 610 may determine an application ID that indicates a type of data of the write operation based on the stream ID of the write command. The memory system 610 may determine an attribute of the application ID in response to determining the application ID. The attribute may be an example of a size of the data associated with the write operation, the type of data associated with the write operation, a frequency associated with accessing the data, or any combination thereof. For example, the attribute of the application ID may identify that the data may be hot data, cold data, read-only data, fast data, sequential data, or any combination thereof.

The memory system 610 may perform a look-up procedure in a table in response to receiving the write command. In such cases, determining the application ID may be based on or in response to performing the look-up procedure. For example, the memory system 610 may use a reference list to look up in a table and convert the stream ID to the application ID. In some examples, the stream ID may indicate the application ID. In other examples, the stream ID may be associated with the application ID such that the memory system 610 may use the stream ID to look up the application ID in a table.

At 625, performance constraints may be determined. For example, the memory system 610 may determine whether the one or more performance constraints satisfies a threshold based on the stream ID. The memory system 610 may identify and assign different performance constraints (e.g., requirements) using the stream ID. The performance constraints may include real-time data. In such cases, the memory system may determine whether the type of data associated with the application ID includes the real-time data in response to determining the application ID. In some examples, the type of data associated with the write operation may include a picture, a video, a movie, a cache, an application image, configuration files, or any combination thereof. Each of the types of data may include the real-time data or non real-time data.

At 630, a level may be assigned. For example, the memory system 610 may assign a level associated with the application ID where the level indicates an amount of data to be written for the write operation. The memory system 610 may match (e.g., assign) the application ID to one of the different levels associated with an amount of available space to be written. In some cases, the level may be assigned in response to determining the attribute, determining that the one or more performance constraints satisfies the threshold, determining that type of data comprises the real-time data, or any combination thereof. The memory system 610 may account for real-time data usage if assigning the level.

At 635, an amount of space may be allocated. For example, the memory system 610 may allocate an amount of space available to be written for the write operation in a SLC cache of the memory system 610 based on or in response to the level assigned. The memory system 610 may assign a level to set the SLC cache amount of space that may be used (e.g., written). For example, the memory system may set, in the SLC cache, an upper limit of the amount of space available to be written based on or in response to the level assigned. The set upper limit may be an example of a percentage of the total available SLC cache for the data stream or type of data.

In some cases, the memory system 610 may determine whether the amount of SLC space available to be written satisfies a threshold directly in response to assigning the level associated with the application ID. The memory system 610 may allocate different amounts of space for different levels, for different applications (e.g., different types of data), or both. In some examples, the allocated space in the SLC cache may be less than the total space of the SLC cache At 640, data may be written. For example, the memory system 610 may write the data to the SLC cache within the amount of space of the SLC cache in response to allocating the amount of space available to be written. The memory system 610 may execute the received write command write the data to the memory system 610. In some case, writing the data to the SLC cache may be in response to setting the upper limit.

In some examples, the memory system 610 may write a second set of data to a different cache (e.g., TLC cache, QLC cache, MLC cache) of the memory system 610 in response to determining that the amount of space available to be written in the single-level cell cache satisfies the threshold. For example, if the type of data received exceeds the threshold (e.g., the type of data is received at a same time of a different type of data, if the type of data is larger than the space available in the SLC cache), then the memory system 610 may write the data to a different cache. The different cache may be configured to store a higher order level cell than the SLC cache.

At 645, an indication may be transmitted. For example, the memory system 610 may transmit, to the host system 605, an indication of allocating the amount of space available to be written in the SLC cache directly in response to writing the data to the SLC cache of the memory system 610. In such cases, the memory system 610 may provide a verification, to the host system 605, of the use of the SLC cache.

Figure 7:
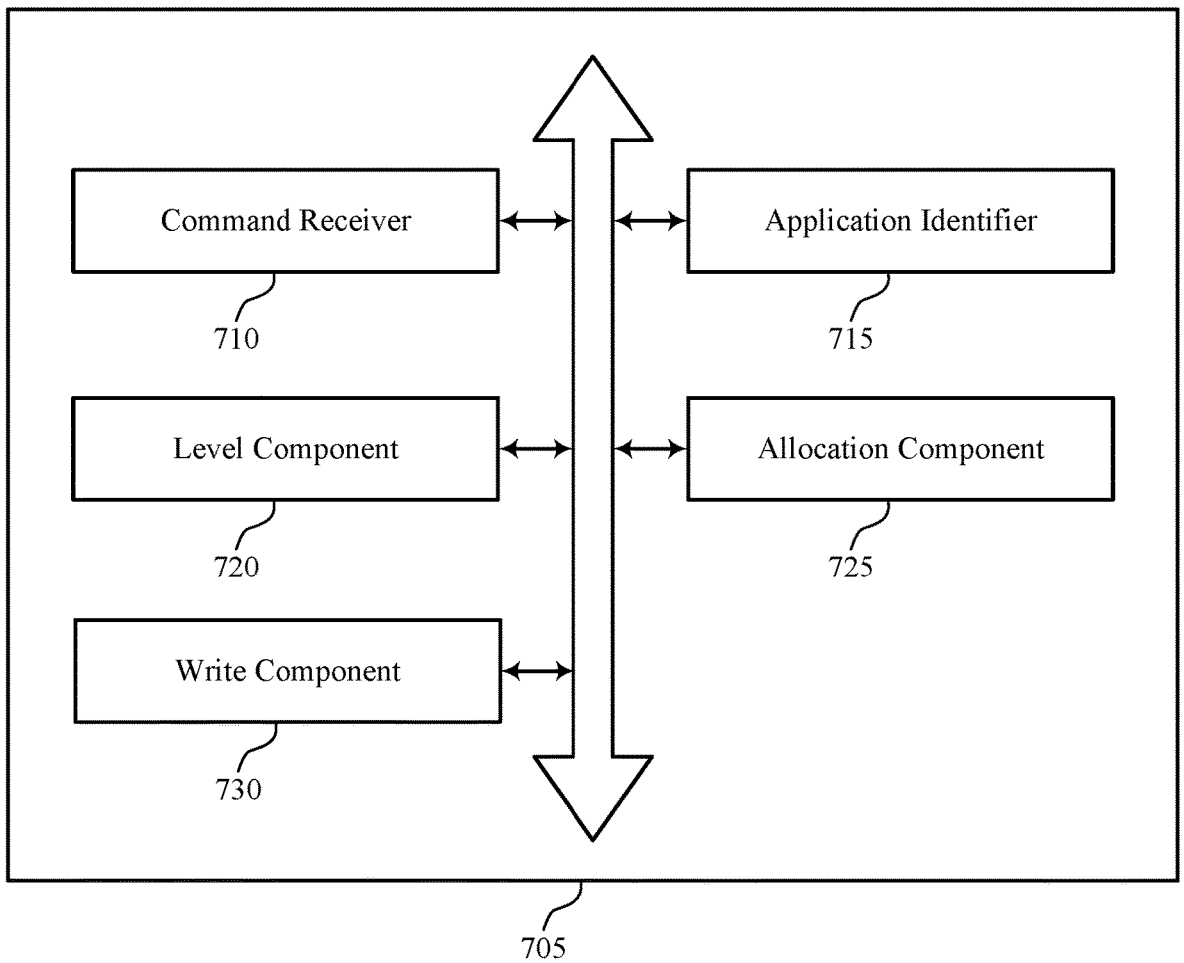
FIG. 7 shows a block diagram of a memory system that supports cache allocation techniques in accordance with examples as disclosed herein.

FIG. 7 illustrates an example of a block diagram 700 that supports cache allocation techniques in accordance with examples as disclosed herein. The memory system 705 may be an example of aspects of a memory system as described with reference to FIGS. 1 through 6. The memory system 705, or various components thereof, may be an example of means for performing various aspects of volatile register to detect power loss as described herein. For example, the memory system 705 may include a command receiver 710, an application identifier 715, a level component 720, an allocation component 725, a write component 730, or any combination thereof. Each of these components may communicate, directly or indirectly, with one another (e.g., via one or more buses).

The command receiver 710 may be configured as or otherwise support a means for receiving, from a host system, a write command to perform a write operation, the write command comprising a stream identification (ID) associated with one or more performance constraints for one or more data streams associated with the write operation. The application identifier 715 may be configured as or otherwise support a means for determining an application ID that indicates a type of data of the write operation based at least in part on the stream ID of the write command. The level component 720 may be configured as or otherwise support a means for assigning a level associated with the application ID and indicating an amount of data to be written for the write operation. The allocation component 725 may be configured as or otherwise support a means for allocating an amount of space available to be written for the write operation in a single-level cell cache of the memory system based at least in part on the level assigned. The write component 730 may be configured as or otherwise support a means for writing the data to the single-level cell cache of the memory system within the amount of space of the single-level cell cache based at least in part on allocating the amount of space available to be written.

In some examples, the allocation component 725 may be configured as or otherwise support a means for setting, in the single-level cell cache, an upper limit of the amount of space available to be written based at least in part on the level assigned, where writing the data to the single-level cell cache may be based at least in part on setting the upper limit.

In some examples, the level component 720 may be configured as or otherwise support a means for determining whether the one or more performance constraints satisfies a threshold based at least in part on the stream ID, where assigning the level may be based at least in part on determining that the one or more performance constraints satisfies the threshold.

In some examples, the application identifier 715 may be configured as or otherwise support a means for determining whether the type of data includes the real-time data based at least in part on determining the application ID, where assigning the level may be based at least in part on determining that type of data includes the real-time data.

In some examples, the application identifier 715 may be configured as or otherwise support a means for determining an attribute of the application ID based at least in part on determining the application ID, where assigning the level may be based at least in part on determining the attribute, where the attribute includes a size of the data associated with the write operation, the type of data associated with the write operation, a frequency associated with accessing the data, or any combination thereof.

In some examples, the allocation component 725 may be configured as or otherwise support a means for determining whether the amount of space available to be written in the single-level cell cache satisfies a threshold based at least in part on assigning the level associated with the application ID. In some examples, the write component may be configured as or otherwise support a means for writing a second set of data to a different cache of the memory system based at least in part on determining that the amount of space available to be written in the single-level cell cache satisfies the threshold, the different cache being configured to store a higher order level cell than the single-level cell cache.

In some examples, the allocation component 725 may be configured as or otherwise support a means for transmitting, to the host system, an indication of allocating the amount of space available to be written in the single-level cell cache based at least in part on writing the data to the single-level cell cache of the memory system.

In some examples, the application identifier 715 may be configured as or otherwise support a means for performing a look-up procedure in a table based at least in part on receiving the write command, where determining the application ID may be based at least in part on performing the look-up procedure.

In some examples, the amount of space available to be written may be allocated differently based at least in part on different assigned levels, different types of data, or both.

In some examples, allocating the amount of space available to be written may be less than a total amount of space available to be written in the single-level cell cache of the memory system.

In some examples, the type of data associated with the write operation includes a picture, a video, a movie, a cache, an application image, configuration files, or any combination thereof.

Figure 8:
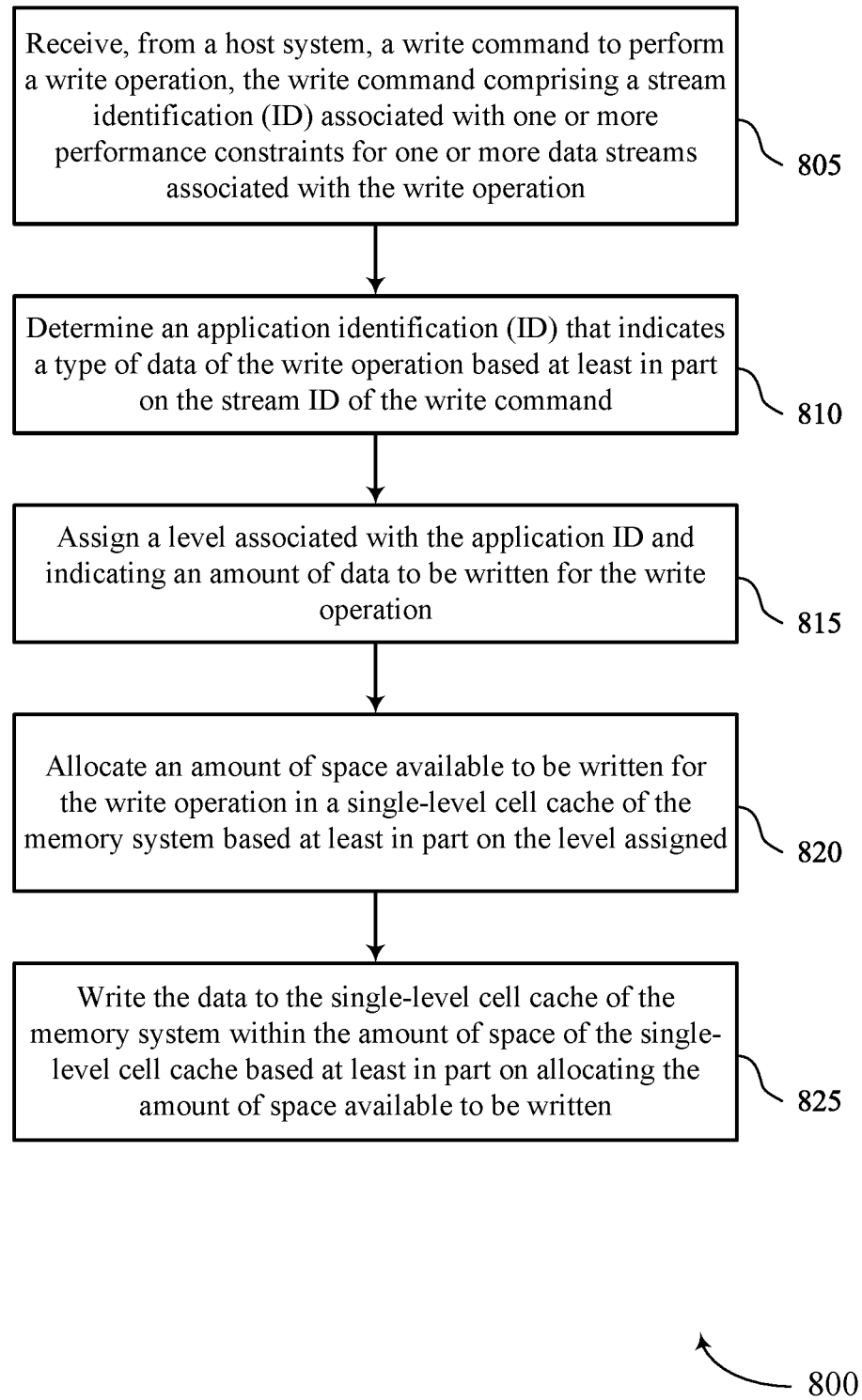
FIG. 8 shows a flowchart illustrating a method or methods that support cache allocation techniques in accordance with examples as disclosed herein.

FIG. 8 shows a flowchart illustrating a method 800 that supports cache allocation techniques in accordance with examples as disclosed herein. The operations of method 800 may be implemented by a memory system or its components as described herein. For example, the operations of method 800 may be performed by the memory system. In some examples, the memory system may execute a set of instructions to control the functional elements of the device to perform the described functions. Additionally or alternatively, the memory system may perform aspects of the described functions using special-purpose hardware.

At 805, a write command may be received. For example, the method may include receiving, from a host system, a write command to perform a write operation, the write command including a stream identification (ID) associated with one or more performance constraints for one or more data streams associated with the write operation. The operations of 805 may be performed in accordance with examples as disclosed herein. In some examples, aspects of the operations of 805 may be performed by a command receiver 710 as described with reference to FIG. 7.

At 810, an application ID may be determined. For example, the method may include determining an application ID that indicates a type of data of the write operation based at least in part on the stream ID of the write command. The operations of 810 may be performed in accordance with examples as disclosed herein. In some examples, aspects of the operations of 805 may be performed by an application identifier 715 as described with reference to FIG. 7.

At 815, a level may be assigned. For example, the method may include assigning a level associated with the application ID and indicating an amount of data to be written for the write operation. The operations of 815 may be performed in accordance with examples as disclosed herein. In some examples, aspects of the operations of 805 may be performed by a level component 720 as described with reference to FIG. 7.

At 820, an amount of space may be allocated. For example, the method may include allocating an amount of space available to be written for the write operation in a single-level cell cache of the memory system based at least in part on the level assigned. The operations of 820 may be performed in accordance with examples as disclosed herein. In some examples, aspects of the operations of 805 may be performed by an allocation component 725 as described with reference to FIG. 7.

At 825, data may be written. For example, the method may include writing the data to the single-level cell cache of the memory system within the amount of space of the single-level cell cache based at least in part on allocating the amount of space available to be written. The operations of 825 may be performed in accordance with examples as disclosed herein. In some examples, aspects of the operations of 805 may be performed by a write component 730 as described with reference to FIG. 7.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving, from a host system, a write command to perform a write operation, the write command including a stream ID associated with one or more performance constraints for one or more data streams associated with the write operation, determining an application ID that indicates a type of data of the write operation based at least in part on the stream ID of the write command, assigning a level associated with the application ID and indicating an amount of data to be written for the write operation, allocating an amount of space available to be written for the write operation in a single-level cell cache of the memory system based at least in part on the level assigned, and writing the data to the single-level cell cache of the memory system within the amount of space of the single-level cell cache based at least in part on allocating the amount of space available to be written.

In some examples of the method 800 and the apparatus described herein, allocating the amount of space may include operations, features, circuitry, logic, means, or instructions for setting, in the single-level cell cache, an upper limit of the amount of space available to be written based at least in part on the level assigned, where writing the data to the single-level cell cache may be based at least in part on setting the upper limit.

Some examples of the method 800 and the apparatus described herein may further include operations, features, circuitry, logic, means, or instructions for determining whether the one or more performance constraints satisfies a threshold based at least in part on the stream ID, where assigning the level may be based at least in part on determining that the one or more performance constraints satisfies the threshold.

In some examples of the method 800 and the apparatus described herein, and the method, apparatuses, and non-transitory computer-readable medium may include further operations, features, circuitry, logic, means, or instructions for determining whether the type of data includes the real-time data based at least in part on determining the application ID, where assigning the level may be based at least in part on determining that type of data includes the real-time data.

Some examples of the method 800 and the apparatus described herein may further include operations, features, circuitry, logic, means, or instructions for determining an attribute of the application ID based at least in part on determining the application ID, where assigning the level may be based at least in part on determining the attribute, where the attribute includes a size of the data associated with the write operation, the type of data associated with the write operation, a frequency associated with accessing the data, or any combination thereof.

Some examples of the method 800 and the apparatus described herein may further include operations, features, circuitry, logic, means, or instructions for determining whether the amount of space available to be written in the single-level cell cache satisfies a threshold based at least in part on assigning the level associated with the application ID and writing a second set of data to a different cache of the memory system based at least in part on determining that the amount of space available to be written in the single-level cell cache satisfies the threshold, the different cache being configured to store a higher order level cell than the single-level cell cache.

Some examples of the method 800 and the apparatus described herein may further include operations, features, circuitry, logic, means, or instructions for transmitting, to the host system, an indication of allocating the amount of space available to be written in the single-level cell cache based at least in part on writing the data to the single-level cell cache of the memory system.

Some examples of the method 800 and the apparatus described herein may further include operations, features, circuitry, logic, means, or instructions for performing a look-up procedure in a table based at least in part on receiving the write command, where determining the application ID may be based at least in part on performing the look-up procedure.

In some examples of the method 800 and the apparatus described herein, the amount of space available to be written may be allocated differently based at least in part on different assigned levels, different types of data, or both.

Some examples of the method 800 and the apparatus described herein may further include operations, features, circuitry, logic, means, or instructions for allocating the amount of space available to be written may be less than a total amount of space available to be written in the single-level cell cache of the memory system.

In some examples of the method 800 and the apparatus described herein, the type of data associated with the write operation includes a picture, a video, a movie, a cache, an application image, configuration files, or any combination thereof.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory system configured to store firmware; and
    a control circuit coupled with the memory system and configured to cause the apparatus to:
        receive, from a host system, a write command to perform a write operation, the write command comprising a stream identification (ID) associated with one or more performance constraints for one or more data streams associated with the write operation;
        determine an application identification (ID) that indicates a type of data of the write operation based at least in part on the stream ID of the write command;

assign a level associated with the application ID and indicating an amount of data to be written for the write operation;

allocate an amount of space available to be written for the write operation in a single-level cell cache of the memory system based at least in part on the level assigned; and write the data to the single-level cell cache of the memory system within the amount of space of the single-level cell cache based at least in part on allocating the amount of space available to be written.

2. The apparatus of claim 1, wherein, to allocate the amount of space, the control circuit is configured to cause the apparatus to:

set, in the single-level cell cache, an upper limit of the amount of space available to be written based at least in part on the level assigned, wherein writing the data to the single-level cell cache is based at least in part on setting the upper limit.

3. The apparatus of claim 1, wherein the control circuit is further configured to cause the apparatus to:

determine whether the one or more performance constraints satisfies a threshold based at least in part on the stream ID, wherein assigning the level is based at least in part on determining that the one or more performance constraints satisfies the threshold.

4. The apparatus of claim 3, wherein the one or more performance constraints comprise real-time data, and wherein the control circuit is further configured to cause the apparatus to:

determine whether the type of data comprises the real-time data based at least in part on determining the application ID, wherein assigning the level is based at least in part on determining that type of data comprises the real-time data.

5. The apparatus of claim 1, wherein the control circuit is further configured to cause the apparatus to:

determine an attribute of the application ID based at least in part on determining the application ID, wherein assigning the level is based at least in part on determining the attribute, wherein the attribute comprises a size of the data associated with the write operation, the type of data associated with the write operation, a frequency associated with accessing the data, or any combination thereof.

6. The apparatus of claim 1, wherein the control circuit is further configured to cause the apparatus to:

determine whether the amount of space available to be written in the single-level cell cache satisfies a threshold based at least in part on assigning the level associated with the application ID; and write a second set of data to a different cache of the memory system based at least in part on determining that the amount of space available to be written in the single-level cell cache satisfies the threshold, the different cache being configured to store a higher order level cell than the single-level cell cache.

7. The apparatus of claim 1, wherein the control circuit is further configured to cause the apparatus to:

transmit, to the host system, an indication of allocating the amount of space available to be written in the single-level cell cache based at least in part on writing the data to the single-level cell cache of the memory system.

8. The apparatus of claim 1, wherein the control circuit is further configured to cause the apparatus to:

perform a look-up procedure in a table based at least in part on receiving the write command, wherein determining the application ID is based at least in part on performing the look-up procedure.

9. The apparatus of claim 1, wherein the amount of space available to be written is allocated differently based at least in part on different assigned levels, different types of data, or both.

10. The apparatus of claim 1, wherein allocating the amount of space available to be written is less than a total amount of space available to be written in the single-level cell cache of the memory system.

11. The apparatus of claim 1, wherein the type of data associated with the write operation comprises a picture, a video, a movie, a cache, an application image, configuration files, or any combination thereof.

12. A non-transitory computer-readable medium storing code comprising instructions, which when executed by a processor of an electronic device, cause the electronic device to:

receive, from a host system, a write command to perform a write operation, the write command comprising a stream identification (ID) associated with one or more performance constraints for one or more data streams associated with the write operation;

determine an application identification (ID) that indicates a type of data of the write operation based at least in part on the stream ID of the write command;

assign a level associated with the application ID and indicating an amount of data to be written for the write operation;

allocate an amount of space available to be written for the write operation in a single-level cell cache of a memory system based at least in part on the level assigned; and write the data to the single-level cell cache of the memory system within the amount of space of the single-level cell cache based at least in part on allocating the amount of space available to be written.

13. The non-transitory computer-readable medium of claim 12, wherein the instructions that, when executed by the processor of the electronic device, cause the electronic device to allocate the amount of space, when executed by the processor of the electronic device, cause the electronic device to:

set, in the single-level cell cache, an upper limit of the amount of space available to be written based at least in part on the level assigned, wherein writing the data to the single-level cell cache is based at least in part on setting the upper limit.

14. The non-transitory computer-readable medium of claim 12, wherein the instructions, when executed by the processor of the electronic device, further cause the electronic device to:

determine whether the one or more performance constraints satisfies a threshold based at least in part on the stream ID, wherein assigning the level is based at least in part on determining that the one or more performance constraints satisfies the threshold.

15. The non-transitory computer-readable medium of claim 14, wherein the instructions, when executed by the processor of the electronic device, further cause the electronic device to:

determine whether the type of data comprises real-time data based at least in part on determining the application ID, wherein assigning the level is based at least in part on determining that type of data comprises the real-time data.

16. The non-transitory computer-readable medium of claim 12, wherein the instructions, when executed by the processor of the electronic device, further cause the electronic device to:

determine an attribute of the application ID based at least in part on determining the application ID, wherein assigning the level is based at least in part on determining the attribute, wherein the attribute comprises a size of the data associated with the write operation, the type of data associated with the write operation, a frequency associated with accessing the data, or any combination thereof.

17. A method, comprising:

receiving, from a host system, a write command to perform a write operation, the write command comprising a stream identification (ID) associated with one or more performance constraints for one or more data streams associated with the write operation;

determining an application identification (ID) that indicates a type of data of the write operation based at least in part on the stream ID of the write command;

assigning a level associated with the application ID and indicating an amount of data to be written for the write operation;

allocating an amount of space available to be written for the write operation in a single-level cell cache of a memory system based at least in part on the level assigned; and writing the data to the single-level cell cache of the memory system within the amount of space of the single-level cell cache based at least in part on allocating the amount of space available to be written.

18. The method of claim 17, wherein allocating the amount of space further comprises:

setting, in the single-level cell cache, an upper limit of the amount of space available to be written based at least in part on the level assigned, wherein writing the data to the single-level cell cache is based at least in part on setting the upper limit.

19. The method of claim 17, further comprising:

determining whether the one or more performance constraints satisfies a threshold based at least in part on the stream ID, wherein assigning the level is based at least in part on determining that the one or more performance constraints satisfies the threshold.

20. The method of claim 17, further comprising:

determining whether the type of data comprises real-time data based at least in part on determining the application ID, wherein assigning the level is based at least in part on determining that type of data comprises the real-time data.

* * * * *